(12) United States Patent
Sun et al.

(10) Patent No.: US 8,998,087 B2
(45) Date of Patent: Apr. 7, 2015

(54) RFID TAG AND ARTICLE-MONITORING SYSTEM USING SAME

(71) Applicants: Hong Fu Jin Precision Industry (ShenZhen) Co., Ltd., Shenzhen (CN); Hon Hai Precision Industry Co., Ltd., New Taipei (TW)

(72) Inventors: Zong-Yuan Sun, New Taipei (TW); Da-Hua Xiao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/079,707

(22) Filed: Nov. 14, 2013

(65) Prior Publication Data

US 2015/0001297 A1    Jan. 1, 2015

(30) Foreign Application Priority Data

Jun. 28, 2013  (CN) .......................... 2013 1 2640489

(51) Int. Cl.
*G06K 7/00*     (2006.01)
*G06K 19/077*   (2006.01)

(52) U.S. Cl.
CPC ................. *G06K 19/07749* (2013.01)

(58) Field of Classification Search
CPC ........................ G06K 7/086; G06K 17/0022
USPC ................. 235/439, 462.46, 472.02
See application file for complete search history.

(56) References Cited

U.S. PATENT DOCUMENTS

| | | | |
|---|---|---|---|
| 7,839,124 B2 * | 11/2010 | Yamazaki et al. | 320/134 |
| 8,237,561 B2 * | 8/2012 | Beigel et al. | 340/572.1 |
| 8,279,067 B2 * | 10/2012 | Berger et al. | 340/572.1 |
| 8,717,165 B2 * | 5/2014 | Gernandt et al. | 340/539.13 |

* cited by examiner

*Primary Examiner* — Daniel St Cyr
(74) *Attorney, Agent, or Firm* — Novak Druce Connolly Bove + Quigg LLP

(57) ABSTRACT

A radio frequency identification (RFID) tag includes a power supply, a RFID microchip, an enable unit, an adhesive unit, and a conducting unit. The adhesive unit is positioned on a bottom surface of the RFID tag. The conducting unit is secured to the bottom surface of the RFID tag through the adhesive unit. An end of the conducting unit is electronically connected to the power supply or the enable unit. Another end of the conducting unit is connected to the RFID microchip. The power supply or the enable unit switches on/off the RFID microchip through the conducting unit.

13 Claims, 2 Drawing Sheets

RFID TAG AND ARTICLE-MONITORING SYSTEM USING SAME

BACKGROUND

1. Technical Field

The disclosure generally relates to radio frequency identification (RFID) tags, and particularly to a RFID tag having a burglarproof function and an article-monitoring system using same.

2. Description of the Related Art

Expensive devices or articles (e.g., computers) are widely employed in banks, offices, hotels, or other businesses and generally need additional manpower for visual detection, which will lead to an expensive cost and a low monitoring efficiency.

Therefore, there is room for improvement within the art.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
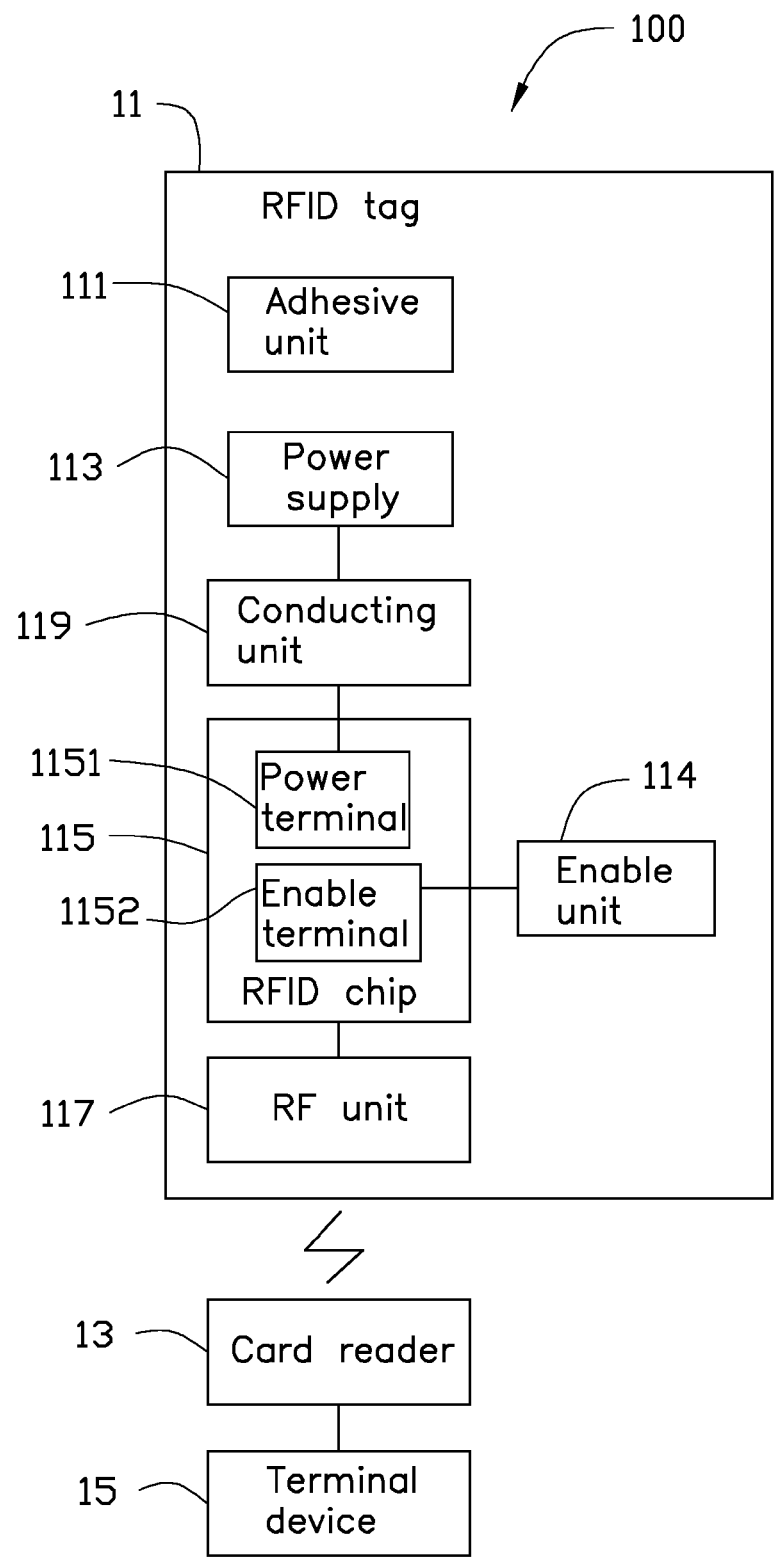
FIG. 1 is a block diagram of an article-monitoring system including a radio frequency identification (RFID) tag, according to a first exemplary embodiment.

FIG. 1 is a block diagram of an article-monitoring system 100, according to a first exemplary embodiment. The article-monitoring system 100 can monitor or track articles employed in banks, offices, hotels, or other business to deter the articles from being stolen or lost. The article-monitoring system 100 includes a RFID tag 11, a card reader 13, and a terminal device 15.

The RFID tag 11 includes an adhesive unit 111, a power supply 113, an enable unit 114, a RFID microchip 115, a radio frequency (RF) unit 117, and a conducting unit 119. The adhesive unit 111 is positioned on a bottom surface of the RFID tag 11. The RFID tag 11 is attached to a surface of the article through the adhesive unit 111 and configured to identify a corresponding article. In this exemplary embodiment, the adhesive unit 111 may be adhesive, glue, or other adhesive material to ensure that the RFID tag 11 is firmly secured to the article. The power supply 113 is configured to provide power to the RFID microchip 115. The enable unit 114 is electronically connected to the RFID microchip 115. The enable unit 114 outputs an enable signal to the RFID microchip 115 to drive the RFID microchip 115 to work.

The RFID microchip 115 includes a power terminal 1151 and an enable terminal 1152. In this exemplary embodiment, the RF unit 117 may be an antenna. The conducting unit 119 may be a metal wire, a carbon electrode, or other conductive elements. A middle portion of the conducting unit 119 is fixed on the bottom surface of the RFID tag 11 through the adhesive unit 111. An end of the conducting unit 119 is electronically connected to the power supply 113. Another end of the conducting unit 119 is electronically connected to the power terminal 1151 of the RFID microchip 115. The enable terminal 1152 of the RFID microchip 15 is electronically connected to the enable unit 14.

In this exemplary embodiment, the conducting unit 119 is equated to a switch. The power supply 113 powers on/off the RFID microchip 115 through the conducting unit 119. For example, when the RFID tag 11 is attached on the article normally (e.g., the conducting unit 119 is not fractured), the conducting unit 119 electronically connects the power supply 113 and the power terminal 1151 of the RFID microchip 15 normally, and the power supply 113 provides power to the RFID microchip 115 by the conducting unit 119. Thus, the RFID microchip 115 is powered on and wirelessly communicates with the card reader 13 through the RF unit 117 so that identifying information (e.g., a name of the article or a price of the article) stored in the RFID microchip 115 can be sent to the card reader 13 normally. Once the RFID tag 11 is separated from the article, the conducting unit 119 is fractured. Thus, the conducting unit 119 is unable to connect the power supply 113 to the power terminal 1151 of the RFID microchip 115. That is, the conducting unit 119 isolates the power supply 113 from the RFID microchip 115, the RFID microchip 115 is powered off and unable to communicate with the card reader 13 through the RF unit 117 so that the identifying information stored in the RFID microchip 115 cannot be sent to the card reader 13.

The card reader 13 is configured to get identifying information of the RFID tag 11 at a predefined interval and decodes the received identifying information. The card reader 13 further sends the decoded identifying information to the terminal device 15.

The terminal device 15 may be a personal computer (PC), a single microchip computer, or other data terminal devices. The terminal device 15 is electronically connected to the card reader 13 by RS232 protocol or I2C protocol. The terminal device 15 determines whether the article is stolen or lost according to the received identifying information or no information. In detail, when the article integrated with the RFID tag 11 leaves a predefined monitored area, the article is away from the card reader 13 gradually. In general, there is a sensing distance (e.g., 3 meters) between the card reader 13 and the RFID tag 11. Thus, once the article integrated with the RFID tag 11 is out of the sensing distance, the card reader 13 cannot obtain identifying information of the RFID tag 11 in the predefined interval. Similarly, when the article leaves the predefined monitored area after the RFID tag 11 being separated from the article, the conducting unit 119 is fractured. As detailed above, the card reader 13 also cannot obtain identifying information of the RFID tag 11 in the predefined interval.

In this way, if the card reader 13 can receive identifying information of the RFID tag 11 in the predefined interval, which indicates that the article is still in the monitoring area. If the card reader 13 cannot obtain identifying information of the RFID tag 11 in the predefined interval, which indicates that the article integrated with the RFID tag 11 leaves the monitored area, or the RFID tag 11 is separated from the article and only the article leaves the monitoring area. Then, the card reader 13 can send a warning to the terminal device 15 to remind a user that the article may be stolen or lost.

In use, the RFID tag 11 is attached to a surface of the article. The card reader 13 reads identifying information stored in the RFID tag 11 in a predefined interval. If the card reader 13 cannot obtain identifying information of the RFID tag 11 in the predefined interval, the card reader 13 determines that the article integrated with the RFID tag 11 is not within the monitored area, or the RFID tag 11 is separated from the article and only the article is not within the monitoring area. Then, the card reader 13 sends a warning to the terminal device 15 to remind a user that the article may be stolen or lost. If the card reader 13 receives identifying information of the RFID tag 11 in the predefined interval, which indicates that the article is still in the monitoring area. The card reader 13 sends the received identifying information of the RFID tag 11 to the terminal device 15 to monitor the article in a real time.

It can be understood that if the enable signal is a high level signal (e.g., logic 1), the enable unit 114 may be integrated with the power supply 113. That is, the enable unit 114 is omitted and the enable terminal 1152 is electronically connected to the power supply 113. If the enable signal is a low level signal (e.g., logic 0), the enable unit 114 may be integrated with the grounding element (e.g., ground). That is, the enable unit 114 is omitted and the enable terminal 1152 is connected to ground.

Figure 2:
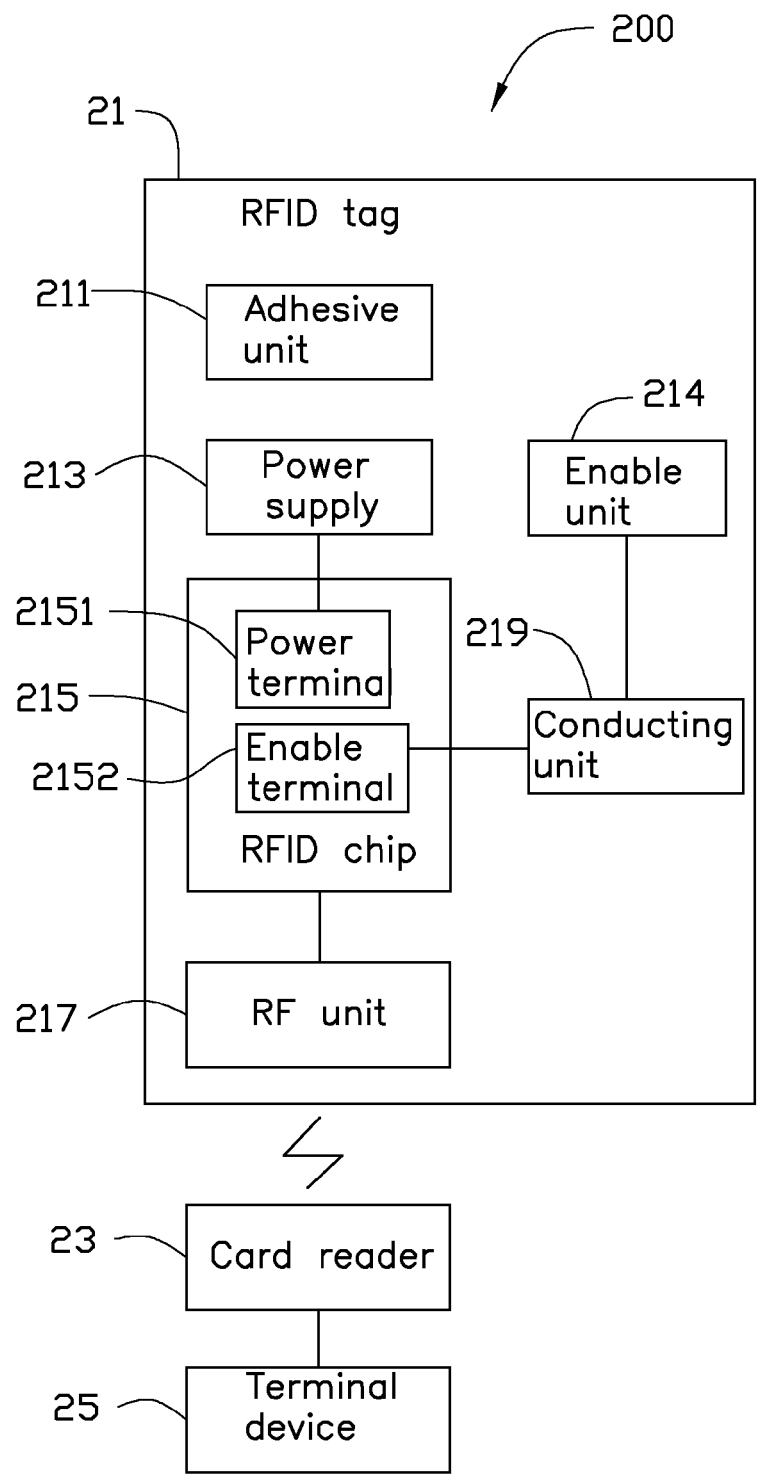
FIG. 2 is a block diagram of an article-monitoring system including a RFID tag, according to a second exemplary embodiment.

FIG. 2 shows an article-monitoring system 200, according to a second exemplary embodiment, differing from the article-monitoring system 100 in that a power supply 213 of the article-monitoring system 200 is directly connected to a power terminal 2151 of a RFID microchip 215 to provide power to the RFID microchip 215. An end of the conducting unit 219 is connected to an enable terminal 2152 of the RFID microchip 215. Another end of the conducting unit 219 is connected to an enable unit 214. In this way, the enable unit 214 enables on/off the RFID microchip 215 through the conducting unit 219.

In detail, when the RFID tag 21 is attached to the article normally (e.g., the conducting unit 219 is not fractured). The conducting unit 219 electronically connects the enable unit 214 and the enable terminal 2152 of the RFID microchip 215 normally. The enable unit 214 provides an enable signal to the RFID microchip 215 by the conducting unit 219. Thus, the RFID microchip 25 is enabled and works normally. The RFID tag 21 can wirelessly communicate with the card reader 23 through the RF unit 217. Once the RFID tag 21 is separated from the article, the conducting unit 219 is fractured. Thus, the conducting unit 219 is unable to connect the enable unit 214 to the enable terminal 2152 of the RFID microchip 215. That is, the conducting unit 219 isolates the enable unit 214 from the RFID microchip 215, and the RFID microchip 215 stop working so that identifying information stored in the RFID microchip 215 cannot be sent to the card reader 23.

In summary, the article-monitoring system includes a RFID tag, the RFID tag is attached on a surface of the article. Thus, once the article integrated with the RFID tag leaves the predefined monitored area, or the RFID tag is separated from the article and only the article leaves the predefined monitored area, the article-monitoring system can directly determine that the article is stolen or lost and further sends a warning to remind a user to monitor the article effectively and does not need additional manpower for visual detection.

In the present specification and claims, the word "a" or "an" preceding an element does not exclude the presence of a plurality of such elements. Further, the word "comprising" does not exclude the presence of elements or steps other than those listed.

It is to be also understood that even though numerous characteristics and advantages of exemplary embodiments have been set forth in the foregoing description, together with details of the structures and functions of the embodiments, the disclosure is illustrative only, and changes may be made in detail, especially in matters of arrangement of parts within the principles of this disclosure to the full extent indicated by the broad general meaning of the terms in which the appended claims are expressed.

What is claimed is:

1. A radio frequency identification (RFID) tag, comprising:
a power supply;
a RFID microchip;
an enable unit;
an adhesive unit positioned on a bottom surface of the RFID tag for securing the RFID tag to an article; and
a conducting unit secured to the bottom surface of the RFID tag through the adhesive unit;
wherein an end of the conducting unit is electronically connected to the power supply or the enable unit; another end of the conducting unit is connected to the RFID microchip; the power supply or the enable unit switches on/off the RFID microchip through the conducting unit to determine whether the article adhered to the RFID tag leaves a predefined monitored area or the RFID tag is separated from the article.

2. The RFID tag of claim 1, wherein the RFID microchip comprises a power terminal and an enable terminal, an end of the conducting unit is connected to the power supply, another end of the conducting unit is connected to the power terminal; the enable terminal is connected to the enable unit.

3. The RFID tag of claim 1, wherein the RFID microchip comprises a power terminal and an enable terminal, an end of the conducting unit is connected to the enable unit, another end of the conducting unit is connected to the enable terminal; the power terminal is connected to the power supply.

4. The RFID tag of claim 1, wherein the adhesive unit is an adhesive.

5. The RFID tag of claim 1, wherein the conducting unit is a metal wire or a carbon electrode.

6. An article-monitoring system for monitoring an article, comprising:
a reader card;
a radio frequency identification (RFID) tag, the RFID comprising:
a power supply;
a RFID microchip;
an enable unit;
an adhesive unit positioned on a bottom surface of the RFID tag, the RFID tag secured to the article through the adhesive unit; and
a conducting unit secured to the bottom surface of the RFID tag through the adhesive unit;
wherein an end of the conducting unit is electronically connected to the power supply or the enable unit; another end of the conducting unit is connected to the RFID microchip; the power supply or the enable unit switches on/off the RFID microchip through the conducting unit to determine whether the article adhered to the RFID tag leaves a predefined monitored area or the RFID tag is separated from the article.

7. The article-monitoring system of claim 6, wherein the RFID microchip comprises a power terminal and an enable terminal, an end of the conducting unit is connected to the power supply, another end of the conducting unit is connected to the power terminal; the enable terminal is connected to the enable unit.

8. The article-monitoring system of claim 6, wherein the RFID microchip comprises a power terminal and an enable terminal, an end of the conducting unit is connected to the enable unit, another end of the conducting unit is connected to the enable terminal; the power terminal is connected to the power supply.

9. The article-monitoring system of claim 6, wherein the adhesive unit is adhesive.

10. The article-monitoring system of claim 6, wherein the conducting unit is a metal wire or a carbon electrode.

11. The article-monitoring system of claim 6, wherein the RFID tag further comprises a RF unit, the RF unit is connected to the RFID microchip, the card reader reads identifying information of the RFID tag through the RF unit.

12. The article-monitoring system of claim 11, wherein the RF unit is an antenna.

13. The article-monitoring system of claim 11, further comprising a terminal device, when the card reader gets the identifying information of the RFID tag in a predefined interval, the card reader determines the article is in the predefined monitored area and sends the identifying information to the terminal device to monitor the article in a real time; when the card reader cannot obtain identifying information of the RFID tag in the predefined interval, the card reader determines the article is stolen or lost and sends a warning to the terminal device to remind a user.

* * * * *